UNITED STATES PATENT OFFICE.

CHARLES GRASSER, OF SOMERVILLE, MASSACHUSETTS, ASSIGNOR TO THE AMERICAN ART FOUNDRY, OF SAME PLACE.

IMPROVEMENT IN MODES OF MAKING MOLDS FOR CASTINGS.

Specification forming part of Letters Patent No. 162,056, dated April 13, 1875; application filed August 21, 1874.

*To all whom it may concern:*

Be it known that I, CHARLES GRASSER, of Somerville, in the county of Middlesex and State of Massachusetts, have invented a new and Improved Process for Making Molds for Casting Metals, of which the following is a specification:

My process consists in constructing molds of clay or loam, applied to the patterns in the condition of slush, and dried rapidly by the application of powdered brick or other capillary material, which is used on the back of a facing composition, the brick-dust serving to take up the surplus moisture, and being then removed, in part, before the application of the outer coat or mantle. With the latter I apply a body of hair or other fibrous material, to afford greater strength and tenacity.

My invention is carried out in the following manner: The pattern is first coated with fine facing slush or paste by means of a brush, and this is quickly dried by dusting onto it powdered brick or other absorbent, which is then brushed off, taking the moisture with it. The thicker coating of clay, with fiber mingled with it to impart strength and cohesion, is then daubed on by hand, and the whole is buried in brick-dust to dry it.

The employment of an absorbent material, as above described, enables me to use the paste or first facing composition in a very soft state, so as to adapt it to enter the finest parts of the pattern. The absorbent material, in promptly and instantaneously drying the slush, has two important practical effects: First, it prevents any falling away of the material of the mold from any part of the pattern, which is liable to occur in the comparatively slow process of drying by evaporation. This difficulty renders it impossible, under the ordinary process of constructing the molds, to employ the slush in so wet a state as to adapt it to enter the fine interstices of the pattern as closely and completely as it can under my process. Second, the rapid drying of the material of the mold causes a shrinkage therein which has the effect of pressing the partly dry but still plastic material still more firmly and securely upon the pattern and into all its recesses. This effect is produced more especially in the rapid drying of the entire substance of the mold after the application of the outer coat or mantle.

The effect is as fine and sharp as can be produced with metal molds, and involves but a trifling increase of cost as compared with the ordinary sand or loam process.

My invention is applicable to patterns of all kinds and descriptions, whether undercut or not; but for use with undercut patterns I prefer to construct the patterns of wax, rosin, gelatine, or other combustible material, which will become burned and entirely destroyed in the act of baking the molds.

The baking is performed in any customary manner.

I claim as my invention—

The process, substantially as herein described, of constructing molds for casting metals by the application to the patterns of the inner material of the mold, in a soft, wet state, drying the same by the application of an absorbent material and the subsequent application of the more dry and plastic coat or mantle, substantially as set forth.

CHARLES GRASSER.

Witnesses:
J. J. C. SMITH,
MICHAEL SMITH.